Dec. 16, 1930.  F. SCHWEIGERT  1,785,564
PUSH BROOM HANDLE BRACKET
Filed July 11, 1930  2 Sheets-Sheet 1
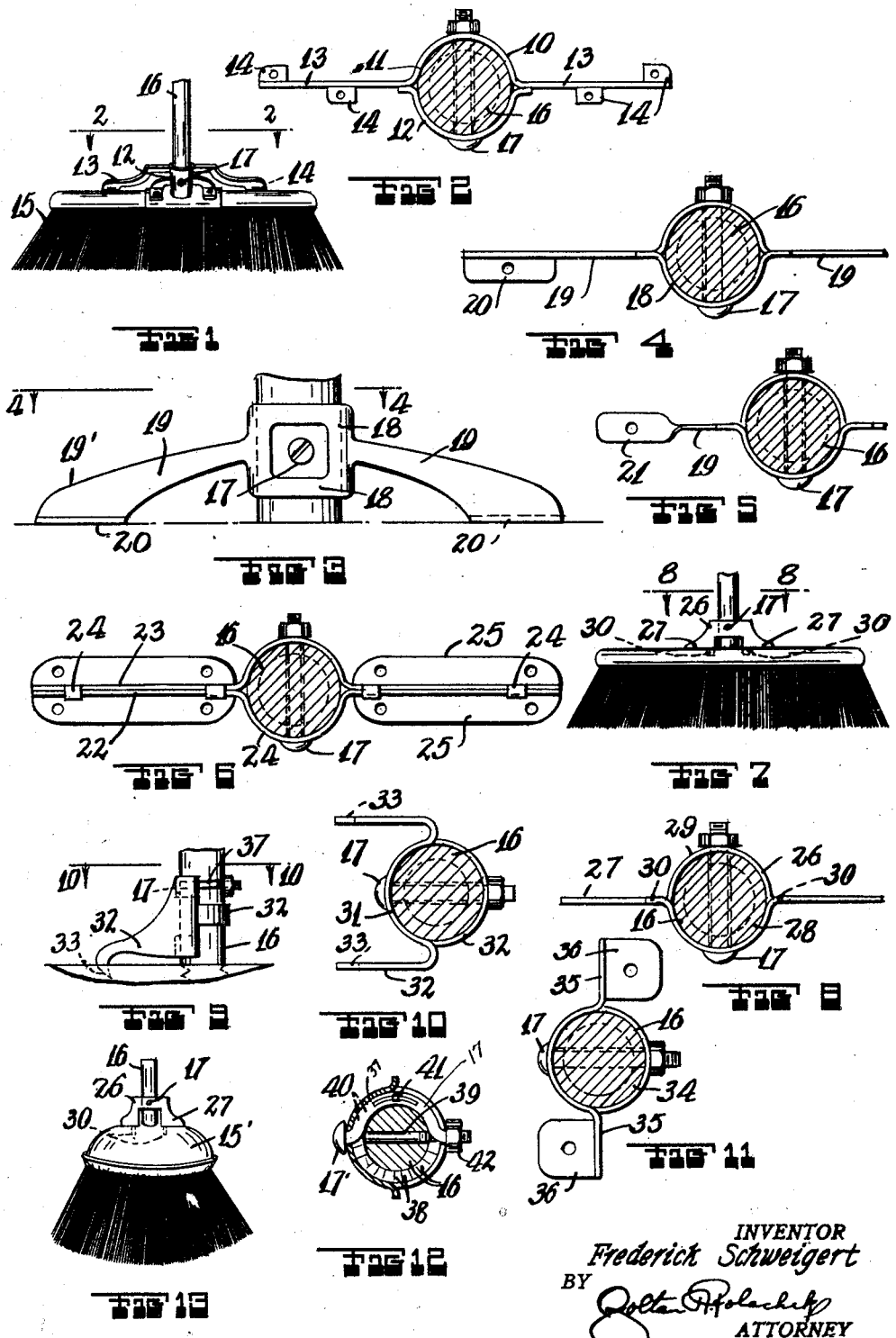
INVENTOR
Frederick Schweigert
BY
ATTORNEY Dec. 16, 1930.   F. SCHWEIGERT   1,785,564
PUSH BROOM HANDLE BRACKET
Filed July 11, 1930   2 Sheets-Sheet 2
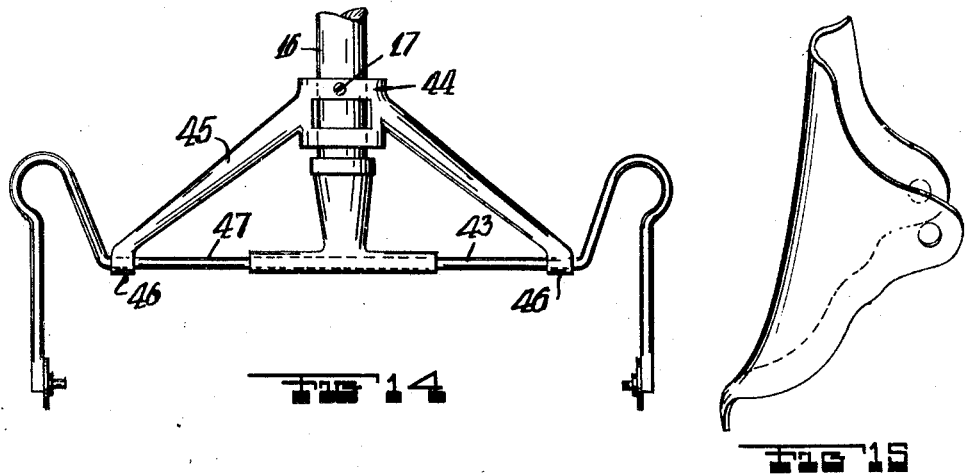
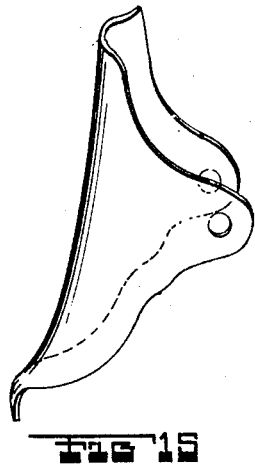
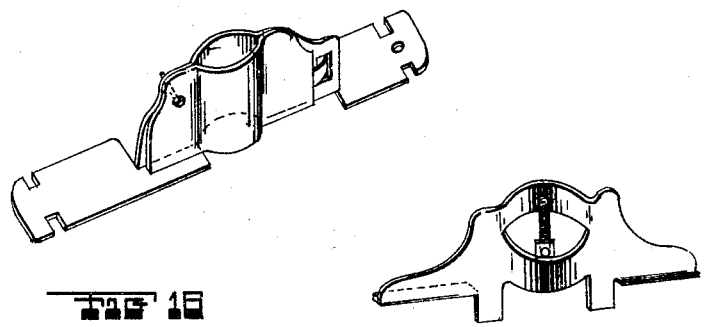
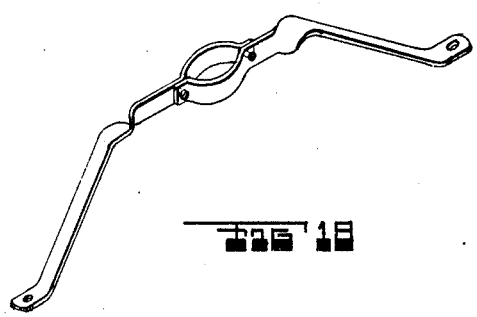
INVENTOR
Frederick Schweigert
BY
ATTORNEY Patented Dec. 16, 1930

1,785,564

UNITED STATES PATENT OFFICE

FREDERICK SCHWEIGERT, OF NEW YORK, N. Y.

PUSH-BROOM-HANDLE BRACKET

Application filed July 11, 1930. Serial No. 467,295.

This invention relates to new and useful improvements in a push broom handle bracket.

The invention has for an object the provision of a device of the class mentioned which is of simple durable construction, dependable in use and efficient in action, and which can be manufactured and sold at a reasonable cost.

The invention proposes a ring portion for encircling a broom handle, a base portion connected with said ring portion for non-rotative connection with the body of said broom, and coacting means on said ring portion for non-rotatively connecting the ring portion with said handle.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a perspective view of a handle bracket constructed according to this invention applied upon a broom.

Fig. 2 is an enlarged horizontal sectional view taken on the line 2—2 of Fig. 1.

Fig. 3 is a side elevational view of another form of bracket constructed according to the same invention.

Fig. 4 is a horizontal sectional view taken on the line 4—4 of Fig. 3.

Fig. 5 is a view similar to Fig. 4, but illustrating another form of bracket.

Fig. 6 is another view similar to Fig. 4, but illustrating still another form of bracket.

Fig. 7 is a side elevational view of another form of bracket shown applied upon a broom.

Fig. 8 is an enlarged horizontal sectional view taken on the line 8—8 of Fig. 7.

Fig. 9 is a fragmentary side elevational view of a portion of a broom shown provided with a bracket of another form.

Fig. 10 is a horizontal sectional view taken on the line 10—10 of Fig. 9.

Fig. 11 is a view similar to Fig. 10, but illustrating another form.

Fig. 12 is a horizontal sectional view of the various forms previously described but taken through the supporting bolt.

Fig. 13 is a side elevational view of another form of broom provided with a bracket similar to the one shown in Fig. 7.

Fig. 14 is a side elevational view of a bracket applied upon a modified form of handle for a broom or vacuum cleaner support.

Figs. 15, 16, 17 and 18 are perspective views of modified forms of brackets.

The push broom handle bracket comprises a ring portion for encircling a broom handle, a base portion connected with said ring portion for non-rotative connection with the body of said broom, and coacting means on said ring portion for non-rotatively connecting the ring portion with said handle.

In Figs. 1 and 2 the ring portion is indicated by reference numeral 10 and is shown consisting of a section 11 and a section 12. The section 11 is shown integral with the base portion 13, while the section 12 is free. The base portion 13 extends on opposite sides of the portion 11 and is formed with opposed lugs 14 provided with apertures for receiving screws to attach the bracket upon the broom. The broom is indicated by reference numeral 15 and is shown provided with a handle 16. The ring portion of the bracket encircles the handle 16 and a bolt 17 is shown engaged through the bracket and through the handle for non-rotatively connecting the handle with the bracket. Obviously, no matter how long the broom is in use, the handle 16 cannot rotate and become loose.

In Figs. 3 and 4 the bracket has been shown with a ring portion 18 encircling the broom handle 16 and integral with the base portion 19. The top of the base portion 19 may be bound by a soft binder strip 19' to prevent the damaging of furniture. The ring portion is formed by stamping out one portion to be positioned upon one side of the broom handle and another portion to be positioned on the other side. In other words the stamped out portions represent semi-bands and together they form a complete band. The base portion 19 is provided with large end lugs 20 formed with apertures for receiving screws to attach the bracket upon the broom. A bolt 17 is shown engaged through the broom handle 16 and the ring portion for non-rotatively holding the broom handle in place.

In the modified form of the device illustrated in Fig. 5, a base portion 19 has been illustrated which is identical with the portion carrying the corresponding numeral in Fig. 4. The ring portion of this device is also the same as the one in the previous figure. It distinguishes in that the ends of the bracket 19 are twisted at 21 so as to eliminate the necessity of a lug such as 20 in the previous figure. The twisted end is provided with an aperture for the reception of screws to attach it upon a broom handle. A bolt 17 is also used for attaching the bracket upon the broom handle 16.

In Fig. 6 the bracket is shown formed of two separate sections engaged to each other and on opposite sides of the broom handle 16. These sections are indicated by reference numerals 22 and 23, respectively. The ring portion 24 of the bracket is formed by bending the central portions of the sections 22 and 23 to accomplish the encircling of the broom handle. Lugs 24 from one of the sections engage over the edges of the other of the sections forming the bracket to hold these sections together as a unit. Flanges 25 project at right angles to the sections 22 and 23 and at their lower ends, are formed with apertures for the reception of screws to attach the bracket upon a broom.

In Figs. 7 and 8 a modified form of broom handle bracket has been illustrated, which is provided with a ring portion 26 integral with a base portion 27. The ring portion is formed by stamping outwards some circular portions 28 and 29 on opposite sides. The coacting means on the ring portion 26 for non-rotatively connecting the ring portion with the broom handle 16 constitutes the said bolt 17. Lugs 30 project from the bottom of the base portion 27 and in the same plane and engage in apertures formed in the broom handle to accomplish the attachment of the bracket upon the broom handle. Thus the bracket is held non-rotatively connected with the broom head and the broom handle is non-rotatively connected with the bracket.

In Figs. 9 and 10 another form of the device has been illustrated, and comprises a ring portion 31 for encircling a broom handle 16, and a base portion 32 for non-rotative connection with the body of a broom, and coacting means on the ring portion 31 for non-rotatively connecting the ring portion with the broom handle. The body 16 is shown composed of parallel portions terminating at the lower ends in hooks 33 for slightly imbedding into the head of the broom. The ring portion 32 is formed by stamping a portion from the metal comprising the base portion 32. As before stated a bolt 17 is used for holding the bracket upon the broom handle.

In Fig. 11 another form of the device has been illustrated, and is shown to consist of a ring portion 34 for encircling the broom handle 16, a base portion 35 connected with the ring portion for non-rotative connection with the body of the broom, and including lugs 36 provided with apertures for the reception of screws to accomplish the non-rotative attachment. A bolt 17 is shown engaged through the ring portion and through the broom handle for constituting the coacting means on the ring portion and broom handle for non-rotatively connecting these parts.

In Fig. 12 a modified bolt 17' has been shown used for attaching the bracket upon the broom handle. The broom handle is formed with a peripheral groove 37 having its base formed with a plurality of radial slots 38. The peripheral groove 37 is of the same plane with the aperture 39 which is used for the reception of the bolt 17. The bolt 17' does not go through the aperture 39 but extends around in the groove 37. Its lower side is formed with complementary irregularities 40 for engaging in the radial slots 38. A spring 41 is attached upon the top of the central portion of the bolt 17' and acts against the top of the groove 37 for urging the bolt downwards to engage the radial slot structure. A nut 42 is shown engaged upon the free end of the bolt 17'.

The nut 42 may be loosened and the bolt 17' raised against the downward action of the spring 41 so that the portions 40 disengage from the radial slots 38. Then the broom handle 16 may be adjusted in various rotative positions. Upon releasing the bolt 17, it is forced downwards by the spring 41 back into engagement with the radial slots. Thus the broom handle 16 may be adjusted in various rotative positions which is very desirable in that usually due to dampness the broom handle becomes warped and a change in position adds to the comfort of the user, that is, the bowed condition of the broom handle may be moved away from the user of the broom or towards the user depending upon which he desires.

In Fig. 13 a modified form of broom 15' has been illustrated, which is of circular construction. It is shown provided with a handle 16. It is also shown provided with the handle bracket illustrated in Figs. 7 and 8. This bracket serves to hold the broom handle from turning within the broom head.

In Fig. 14 a handle support 43 has been illustrated for attachment upon a vacuum cleaner or broom head, and shown supporting a handle 16. A broom handle bracket constructed according to this invention is engaged upon the handle and the support 43 for the same purpose as previously described. This bracket comprises a ring portion 44 for encircling a broom handle 16, a base portion 45 connected with the ring portion for non-rotative connection to the handle support 43 which is accomplished by curved ends 46 turned around a horizontal bar 47 included in the handle support 46. A bolt 17 is also provided on said ring portion for non-rotatively connecting the ring portion with the handle 16.

The modified forms shown in Figs. 15, 16, 17 and 18 may also be used in connection with my improved push broom handles.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A push broom handle bracket, comprising a ring portion for encircling a broom handle, a base portion connected with said ring portion for non-rotative connection with the body of said broom, and coacting means on said ring portion for non-rotatively connecting the ring portion with said handle, comprising a bolt extended through said ring portion and having a curved central portion for extending around a peripheral groove formed in the broom handle and having radial bottom sections for engaging in radial slots formed in the broom handle, and a spring attached upon the top of the central portion of said bolt for engaging the top of the groove in said broom handle and urging the radial portions together.

2. A push broom handle bracket, comprising a ring portion for encircling a broom handle, a base portion connected with said ring portion for non-rotative connection with the body of said broom, and coacting means on said ring portion for non-rotatively connecting the ring portion with said handle, comprising a bolt extended through said ring portion and engaging in a groove formed in the broom handle, and means for preventing slippage between the said bolt and the sides of said groove.

3. A push broom handle bracket, comprising a ring portion for encircling a broom handle, a base portion connected with said ring portion for non-rotative connection with the body of said broom, and coacting means on said ring portion for non-rotatively connecting the ring portion with said handle, comprising a bolt extended through said ring portion and engaging in a groove formed in the broom handle, and means for preventing slippage between the said bolt and the sides of said groove, comprising projections on said bolt engageable in depressions on the sides of said groove and means for urging said projections into engagement with said depressions.

In testimony whereof I have affixed my signature.

FREDERICK SCHWEIGERT.